United States Patent [19]

Stick et al.

[11] 4,015,466
[45] Apr. 5, 1977

[54] DETERMINATION OF NUMBER OF TEETH ON AN INTERNAL COMBUSTION ENGINE FLYWHEEL

[75] Inventors: Philip P. Stick, Enfield; James F. Willenbecher, East Windsor; Lee R. Armstrong, Enfield, all of Conn.

[73] Assignee: United Technologies Corporation, Hartford, Conn.

[22] Filed: May 7, 1976

[21] Appl. No.: 684,037

[52] U.S. Cl. .............................. 73/116; 235/92 GE
[51] Int. Cl.$^2$ ...................................... G01N 15/00
[58] Field of Search ........................... 324/178, 179; 235/92 CA, 92 GE, 92 MP, 250.2, 251.3; 73/116, 117.2, 117.3, 118

[56] References Cited

UNITED STATES PATENTS 3,012,720  12/1961  Rappaport et al. ............ 235/92 GE Primary Examiner—James J. Gill
Attorney, Agent, or Firm—M. P. Williams

[57] ABSTRACT

A transducer mounted on the flywheel housing of an internal combustion engine senses the passage of each tooth on the flywheel of the engine. The number of teeth in the flywheel (to aid in calculating factors such as engine speed) is measured by counting teeth during one full engine cycle, as determined by successive cylinder identification pulses, and the tooth count is selected from a table of industry standard numbers of permissible teeth as the one which is within two teeth of the count measured by either of the methods described hereinbefore. Display of the selected number of teeth is made without an error indication if within two teeth of a standard number from a table; if not within two teeth of a standard number, the measured number is displayed, and error is indicated. The operator can select the displayed number of teeth or enter a number which he chooses.

9 Claims, 3 Drawing Figures

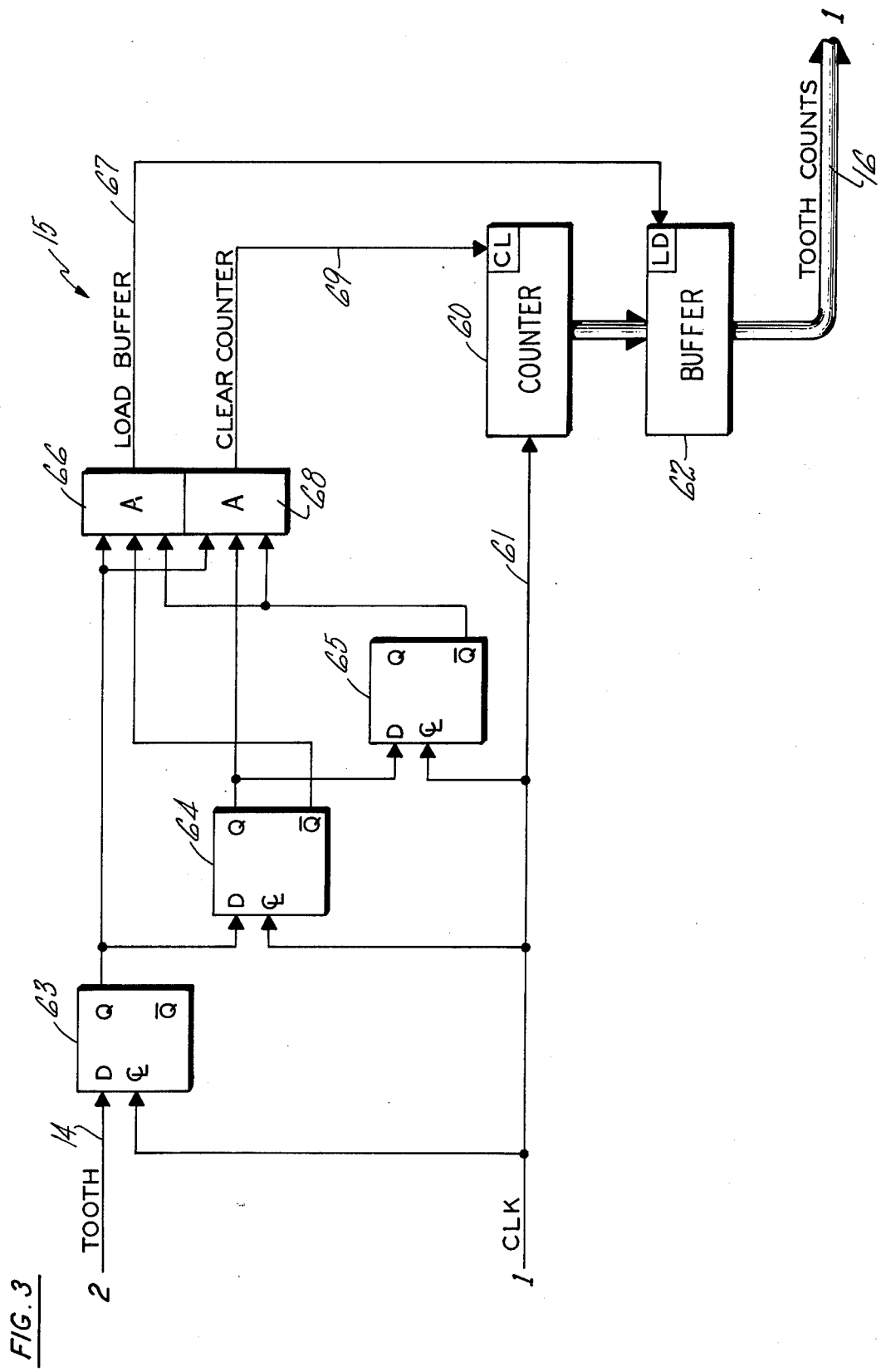

DETERMINATION OF NUMBER OF TEETH ON AN INTERNAL COMBUSTION ENGINE FLYWHEEL

CROSS REFERENCE TO RELATED APPLICATIONS

The subject matter hereof is useful in conjunction with the subject matter disclosed in commonly owned copending applications filed on even date herewith by Rackliffe et al., Ser. No. 684,220, entitled SUB-CYCLIC MEASUREMENT OF SPEED OF AN INTERNAL COMBUSTION ENGINE; and by Tedeschi, Ser. No. 684,221, entitled ENGINE, CYLINDER IDENTIFICATION (CID) TRANSDUCER.

BACKGROUND OF THE INVENTION

1. Field of the Invention

This invention relates to diagnosing internal combustion engines electronically.

2. Description of the Prior Art

Recent advances in apparatus for diagnosing internal combustion engines have resulted in the ability to test various characteristics of the engines in a fully-automated fashion. The improvement in sophistication of engine diagnostics has fostered improved methodology utilizing electronic analysis, frequently employing comprehensive data processing equipment. In addition, improvements in equipment has made it possible to capitalize on improvements in measurement techniques and collection of engine data to a much greater accuracy than in the past. As an example, in a commonly owned copending application Willenbecher et al, Ser. No. 684,036, filed on May 7, 1976 and entitled SPEED-RELATED INDICATION COMPARISONS IN INTERNAL COMBUSTION ENGINE DIAGNOSTICS, the fuel pump of an engine is tested on the engine without the use of a dynomometer by means of snap accelerations during which the instantaneous speed of the engine is very accurately indicated for comparison with fuel pressure specification speeds, and the pressure is measured (on the fly) for each such speed.

There are several ways to measure speed of an internal combustion engine. If the engine has an electric spark, engine speed can be instantaneously determined by cylinder-to-cylinder monitoring of an electrical parameter, such as the low coil signal developed by the ignition points; but if the engine has distributor flaws, such as excessive wear, error may result. Similarly, at any point on an internal combustion engine which is not directly connected to the drive shaft, the intrinsic variations in engine speed on a cylinder-to-cylinder basis (due to ultimate compression and power strokes) can magnify any minute mechanical discontinuity, such as gear backlash or looseness in any mechanical coupling. In diesel engines, there is no electrical signal to monitor; this renders it necessary to determine speed from a point mechanically linked to the crankshaft of the engine. But in diesel engines, effects of wear and backlash are further compounded by large, cyclic variations in engine speed as a consequence of the high compression developed in each cylinder.

The aforementioned copending application of Rackliffe et al discloses a method of determining instantaneous engine speed by sensing the passage of teeth on the flywheel (also referred to herein). However, to relate the number of teeth that may pass a sensor in a given length of time to the fraction or number of revolutions over the same period of time, it is necessary to know the total number of teeth on the flywheel. Although only a few select numbers of teeth are utilized on the flywheels of some types of engines, due to universally-accepted industry standards, and although the number of teeth on the flywheel of any particular engine may be determined from manufacturer's specifications, in many cases (particularly in many commercial diesel engines such as those utilized in large trucks, earth moving equipment, and stationary systems) the number of flywheel teeth frequently does not accompany the engine identification which is available at the time of diagnosis. It is therefore necessary to determine the number of flywheel teeth before utilization of tooth counts in speed measurements.

SUMMARY OF THE INVENTION

Objects of the present invention include improvements in electronic determination of the number of teeth on the flywheel of internal combustion engines, in a variety of ways, with accommodations for different results which may be obtained.

According to the present invention, an electronically-measured count of the number of teeth on a flywheel is compared with a table of permissible numbers, and if the measured number is within a tolerance range of one of the industry standards, that industry standard is selected as the correct number of teeth for the flywheel of the engine under test. According further to the invention, the table of permissible numbers comprises a table of standard data manifestations, each indicative of one of a plurality of standard number of teeth on a flywheel as established by industry-accepted standards.

The invention involves apparatus and method innovations.

According still further to the invention, if the measured number is within a very narrow range of one of the standard numbers, the standard number is presented for system use without any indication to an operator; otherwise, the measured number is presented with an error indication, so that the operator may accept or reject the measured number or select one of the standard numbers.

According to the invention, the number of teeth on the flywheel of an internal combustion engine is electronically measured by counting the number of teeth which pass a tooth sensing means, and measuring the angle of revolution which the engine traverses contemporaneously with the counting of the teeth. In further accord with the invention, the angle of revolution of the engine during tooth counting may be defined by identification signals from engine member sensor means which senses the position of the engine at unique, identifiable points with respect to an engine cycle.

In accordance with the invention in one form, the number of teeth on a flywheel is counted during one engine cycle as defined by a cylinder identification signal derived from a sensor mounted adjacent a cylinder member which indicates a unique position of the member once during each cycle of the engine, thereby uniquely defining the extent of each engine cycle.

The invention provides very fast and accurate determination of the precise number of teeth on the flywheel by comparing a measurement of teeth to industry standards and selecting the closest industry standard if within a given range thereof. The invention provides backup mode operation by providing the measured number (rather than the selected standard number) if the measured number is outside of the given range of any of the standard numbers. Thus the operator can select a number based on the measured number presented with an error signal, or can elect to accept the measured number even though it is outside of the range from any standard number, as seems to be most appropriate in any given instance.

The foregoing and various other objects, features and advantages of the present invention will become more apparent in the light of the following detailed description of exemplary embodiments thereof, as illustrated in the accompanying drawing.

BRIEF DESCRIPTION OF THE DRAWING

FIG. 3 is a simplified schematic diagram of tooth timer means for obtaining instantaneous, sub-cyclic engine speed in the embodiment of FIG. 1.

DESCRIPTION OF THE PREFERRED EMBODIMENTS

Figure 1:
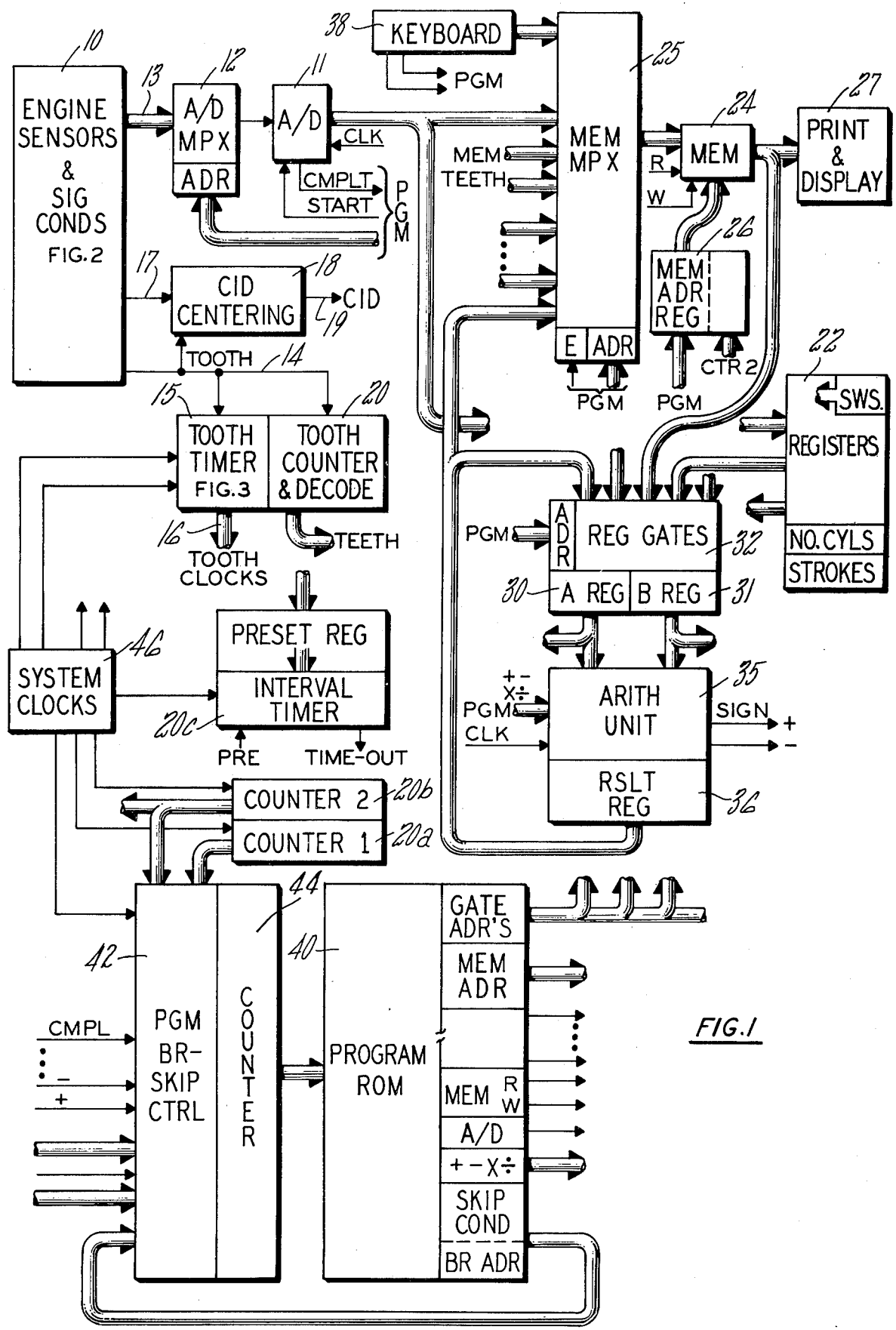
FIG. 1 is a simplified schematic block diagram of a diagnostic system including engine parameter sensing apparatus and exemplary electronic processing apparatus, in which the present invention may be incorporated.

Referring now to FIG. 1, a system which may incorporate the present invention is illustrated as representing the architecture of a typical data processing system or computer together with special purpose apparatus related to an engine diagnostic system of the type in which the invention may be incorporated. Specifically, the system incorporates engine sensors and signal conditioners 10 of a well known type which are adapted to be disposed for response to various parameters or discrete conditions on an engine under test, as described more fully hereinafter. Some of the sensors relate to pressures, temperatures and the like and are therefore analog signals, the magnitude of which is a measure of the parameter being sensed. The outputs of the sensors are fed over lines 13 to an analog to digital converter (A/D) 11 when selected by an A/D multiplexer 12 in response to a particular sensor address applied thereto by the program of the data processor. In addition, a tooth sensor may sense the passage of teeth on the flywheel of the engine to provide a tooth signal on a line 14, the intertooth time interval of which (when the engine is running) is measured by a tooth timer 15 and provided on tooth count lines 16. Another discrete signal is a cylinder or cycle identification signal (CID) on a line 17 which is applied to a CID centering circuit 18 to provide a CID signal on a line 19. The raw CID signal on the line 17 is a signal from a proximity sensor disposed to sense movement of an engine member once in each cycle of the engine, such as the rocker arm for the intake valve of one of the cylinders or a cam, if desired; this provides information of the cylinder-by-cylinder position of the engine at any moment in time in the same fashion as the number one firing in a spark ignition engine, and also provides cycle-to-cycle division of the engine's angular position as it is running or cranking.

In accordance with the invention, the parameters of the engine as provided through the A/D converter 11, and the instantaneous position information with respect to the engine as provided by the CID signal on the line 17 and the tooth signals on the line 14 may be used in diagnosis of the engine in accordance with the invention herein.

Additional special apparatus which may be used (although as described hereinafter is not necessarily required) includes a tooth counter and decode circuit 20, and a pair of counters 20a, 20b referred to as counter 1 and counter 2, and an internal timer 20c, and special purpose registers 22, which may be used (as an alternative to memory) to retain certain factors that are used so often as to render it advisable to have them directly available to the program rather than having to access them in memory, in order to cut down processing time and complexity of programming. Such registers may contain factors utilized in processing data (such as multiplicands used in digital filtering of the data and the like) and information relating to the particular engine under test (such as number of strokes and cylinders) which may be entered by switches manipulated by an operator, the switches feeding binary decode circuits such that the decode constantly reflects the position of the switch on a steady basis in the manner of a register.

The remainder of FIG. 1 is illustrative of one type of data processing apparatus, which is shown for illustrative purposes herein since it is a type that may be advantageous for use where general purpose programming is not required, but rather limited functions are to be performed. A computer, as is known in the art, includes memory (or accessible storage), and arithmetic unit, program control, and the necessary gates, data flow and event decode or monitoring circuits so as to permit advancing logically through the steps which are to be performed. Specifically, a memory 24 may be loaded from a variety of inputs shown on the data flow under control of a memory multiplexer 25 which is enabled and addressed by the program so as to select which of the possible inputs to memory are to be applied thereto, if any. The memory 24 is responsive to a memory address register 26 which may respond to a counter used in program control in a usual fashion. The output of the memory is available to other portions of the data flow, such as print and display apparatus 27 and the arithmetic apparatus including arithmetic unit input registers, referred to herein as an. A register 30 and a B register 31 under control of register gates 32 which are controlled by the program in a known fashion. Herein, the output of the A register and the B register is available to the register gates 32 and to the main data flow, so that their contents may be moved between the registers 30, 31 or to the memory 24. This is to facilitate the particular type of processing which may be employed in an engine diagnostic system, as is described more fully hereinafter. The registers 30, 31 feed an arithmetic unit of a known type 35, the function of which, controlled by the program, is to add, substract, multiply or divide, to provide answers to a result register 36 as well as providing indications of the sign of the result. As indicated in FIG. 1, the result register may be available at the input to the arithmetic unit through the gates 32; alternatively, as is common in many computers the result register could be automatically one of the inputs to the arithmetic unit, and it can be loaded directly from the memory upon a proper command.

In order to provide data inputs to the memory for initialization and to permit a degree of control over the system during processing, a keyboard 38 of a usual variety may be provided. In addition to data inputs, the keyboard may have control function keys that permit choice to the operator of loading memory from the result register or of loading memory in response to the keyboard, depending upon conditions which may be displayed in the print and display apparatus 27.

For the rather limited number of tests being performed in apparatus incorporating the present invention, the program may be controlled in a variety of ways. One way is a program ROM 40 which provides input gate addresses to control the inputs to the memory, the arithmetic input registers, and the A/D converter, etc.; the memory address; the functions to be performed by the arithmetic unit, and other commands such as commands to the memory to cause it to read or write, and to start the A/D converter 11, and the like. Sequencing is controlled by unconditional branch instructions (which provide a branch address) and by skip instructions (dependent on conditions) provided to a branch/skip control 42 at the input to the program counter 44, which is also responsive to system clocks 46. Thus, as is known, for each program clock signal received from the system clocks, the program counter may be advanced, skipped once or twice, or reset to the branch address, in dependence upon the presence of branch or skip instructions.

It should be understood that the particular processing apparatus used, and the degree of use of special purpose apparatus, is dependent upon the particular implementation of the present invention which is to be made, and forms no part of the present invention. If the invention is utilized in a complex, sophisticated diagnostic system in which a variety of diagnostic functions are required, then the type of apparatus selected for processing may be more sophisticated and capable of general purpose utilization in order to accommodate the special requirements of all of the diagnostic procedures to be performed. However, the cost of programming complexity of such a processing system may be unwarranted in a diagnostic system which performs either relatively few or relatively simple tests. As is more apparent in the light of detailed operational descriptions hereinafter, well known processing systems (such as NOVA and PDP/11) employing only programs provided through techniques well known in the art, may be utilized in conjunction with the engine sensors and conditioners 10, suitable input and output apparatus (such as the keyboard 38 and the print and display apparatus 27) and, depending on the processing power of the data processing system selected, some special purpose hardware which may be found advisable, such as the tooth timer 15, the tooth counter 20 and some special registers 22. However, the well known processing systems referred to hereinbefore can provide adequate memory capacity to perform the tooth timing and counting functions, and to provide for the storage of all required parameters and engine information in the memory, as is readily apparent to those skilled in the art.

Figure 2:
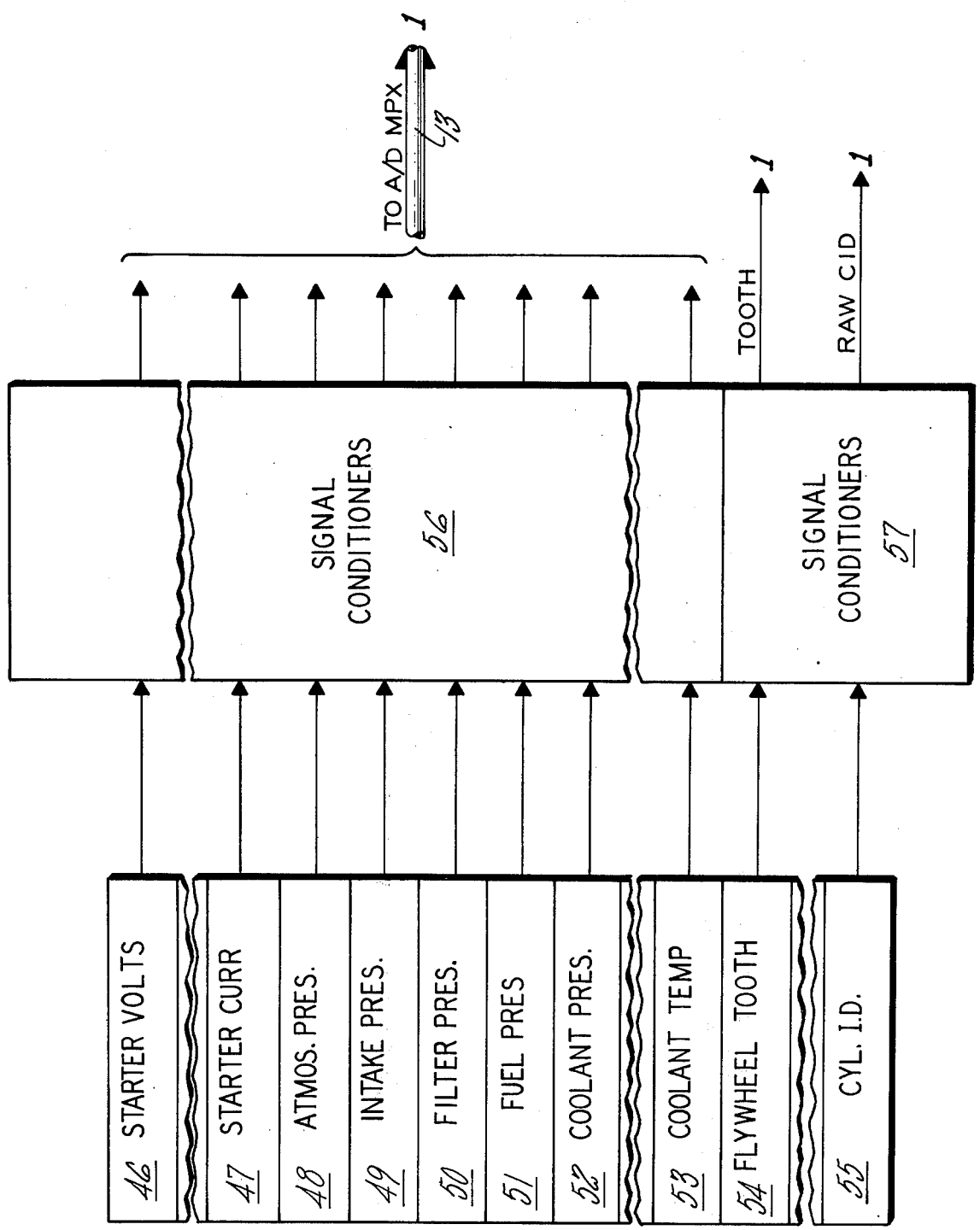
FIG. 2 is a simplified block diagram of engine parameter sensing apparatus for use in the embodiment of FIG. 1.

Referring now to FIG. 2, a plurality of engine sensors in a diagnostic system incorporating the present invention may include, among others not shown in FIG. 2, a starter voltage probe or clamp 46, a starter current probe 47, an atmospheric pressure transducer 48, which could be disposed in general proximity to the engine under test, a pressure transducer 49 to measure the intake manifold air pressure, a filter pressure transducer 50 to measure the pressure of the fuel downstream of the fuel inlet filter, a fuel pressure transducer 51 to measure the pressure at the fuel injector inlet rail of the engine, a coolant pressure transducer 52 which may preferably measure the pressure of coolant at the inlet to the coolant thermostat, a coolant temperature transducer 53 to measure coolant temperature, preferably at the inlet to the thermostat. In a diagnostic system incorporating the present invention there may also be a proximity sensor 54, which may comprise an RGT Model 3010-AN Magnetic Proximity Sensor, provided by Electro Corporation, Sarasota, Fla., for sensing the passage of flywheel teeth past a particular point adjacent to the flywheel housing, and a proximity sensor 55 such as a Model 4947 Proximity Switch distributed by Electro Corporation, for sensing the presence of an engine member which moves in a unique fashion once in each cycle of the engine, which is one revolution in a two stroke engine or two revolutions in a four stroke engine. The proximity sensor 55 may preferably be mounted through the valve cover adjacent to a rocker arm related to the intake valve of one of the cylinders of the engine, thereby to provide information as to the particular point of an engine cycle once in each cycle, as well as to delineate successive engine cycles as the engine is rotating.

Each of the sensors of FIG. 2 is applied to a suitable one of a plurality of signal conditioners 56, 57 to filter out unwanted noise, and to provide, through an amplifier, suitable level adjusting as is appropriate for the circuitry being fed thereby. For instance, the signal conditioners 56 scale the signals to the proper level so that each of them can be fed through a common A/D converter 12 (FIG. 1). The signal conditioners 56, 57 can be suitable ones of a wide variety known in the art, and form no part of the present invention.

Referring now to FIG. 3, the tooth timer 15 includes a counter 60 which repetitively counts clock pulses on a line 61 that may be supplied by system clocks 46 in FIG. 1. The counter is parallel-fed to a buffer 62, the output of which comprises the tooth counts. The counter is running substantially all of the time since a very high frequency clock signal can be utilized on the line 61 (anywhere from tens of KHz to tens of MHz) whereas at speeds from 300 rpm to 2,000 rpm the frequency of the tooth signals on the line 14 may be on the order of 10 Hz to 100 Hz, depending upon the number of teeth. Thus the few clock signals lost during the tooth to tooth resetting of the counter are miniscule.

Each time that a tooth signal appears on the line 14, the next clock signal will set a D-type flip flop 63, the Q output of which is applied to a D-type flip flop 64. The second clock signal following the tooth signal therefore sets the D-type flip flop 64, and since its Q output is applied to a D-type flip flop 65 the third clock signal will cause it to become set. The very first clock signal, after the appearance of the tooth signal, is decoded by an AND circuit 66 since it responds to Q of flip flop 63 and not Q of flip flop 64 and 65; this provides a load buffer signal on a line 67 to cause the buffer 62 to be loaded in parallel from the counter 60. The second clock signal following the appearance of the tooth signal will cause an AND circuit 68 to respond to the Q of flip flops 63 and 64 and the not Q of flip flop 65 so as to generate a clear counter signal on a line 69 which is applied to the clear input of the counter 60 causing it to be cleared to zero. The third clock signal, by setting the flip flop 65, simply eliminates the clear counter signal on the line 69 so that the next leading edge of the clock signal and all subsequent clock signals will be counted in the counter 60. Whenever the tooth signal disappears, (which is totally immaterial) the next three clock signals in a row will cause resetting of the flip flops 63–65, in turn, since each of their D inputs will go down. The counter and the buffer are independent of the resetting of the flip flops 63–65 since both AND circuits 66, 68 operate only during a progression with flip flop 63 on and flip flop 65 off, which does not occur during the resetting of the flip flops.

Thus the tooth timer 15 provides tooth counts on the line 16 which are stable, throughout substantially each intertooth interval. The processing apparatus of FIG. 1 may therefore sample the tooth counts at random. The tooth timer 15 thereby provides very accurate, subcyclic speed measurement, on a tooth to tooth basis, which provides speed indications many times within each individual cylinder stroke portion of each engine cycle.

In the detailed description of exemplary processing hereinafter, the term "ringgear" is sometimes used in place of "flywheel"; they mean the same thing; the abbreviation "RGT" means "ringgear teeth", a stored factor indicating the number of teeth on the flywheel of the engine under test. This may be determined and entered from engine specifications, or as set forth in the aforementioned application of Stick et al, entitled "Determination of Number of Teeth on an internal combustion Engine Flywheel". Other abbreviations include; "RSLT" = result register; "MEM" = memory; "Ctr" = counter; "Factor" means a memory location or a register where the factor is available; "CMPLT" means A/D conversion is completed; "spd" means speed; and other abbreviations are apparent in the drawing. Parentheticals after "MEM", such as "(Freq)", indicate addresses, chosen at will by the programmer, or partially determined by counter two, if so indicated.

The exemplary system herein is designed for four-stroke, six-cylinder engines. If desired, the programming may be altered to compare counts (particularly counter two) with loaded indications of engine variables, such as cylinders, in a well known fashion.

The present invention is disclosed in terms of a diagnostic system adapted to diagnose a six-cylinder four stroke engine. However, factors which may be altered to accommodate other types of engines (different numbers of cylinders, or two stroke engines, and the like) are described hereinafter.

The invention is practiced by performing several major tasks. First, the number of teeth in a full engine cycle are measured, and this is related to a single revolution by dividing it by two. Then comparison is made with each of a standard number of teeth which have been loaded into memory or are provided in any other suitable fashion, starting with the lowest number of teeth and proceeding to the higher number. The first pass through the entire number of teeth is made by comparing the measured number with exactly the numbers in the table, without any leeway. If no exact comparison is successful, then comparison is made within one tooth, starting with the lowest number and ending with the highest number. If still there is no match, then a third pass is made where the number that is measured is compared with each of the standard numbers plus or minus two teeth (a five tooth leeway) starting with the lowest number and ending with the highest number. If that fails, then the measured number is displayed. This provides an indication of error and also gives the operator the choice to select the measured number if he thinks perhaps the measured number is correct for some reason, or to select a number which the operator may feel is most likely the correct number. In addition to error being indicated by displaying the measured number, an additional error signal, such as a light or an error message, may be made to an operator if desired.

The first task of measuring the teeth is accomplished by sensing the teeth and counting them from one cylinder identification signal to another. If desired, the cylinder identification signal can be made more repetitively accurate by utilizing the apparatus of the aforementioned copending application of Tedeschi, which shows in greater detail the CID centering apparatus 18 of FIG. 1 herein. The tooth counter and decode 2 is presumed herein to be a counter which can be started and stopped by the program and will count all of the tooth signals on the line 14 inbetween. The manner of determining the count of teeth may be in accordance with the following instruction steps:

1. Skip one if CID
2. Branch to 1
3. Start Tooth Counter
4. Skip one if CID
5. Branch to 4
6. Stop Tooth Counter
7. Load Tooth Counter to A REG
8. Load 2 Factor to B REG
9. Divide
10. Load RSLT to MEM (Count)

Two counters are utilized in the exemplary program herein. Counter 1 is used simply to determine whether the comparison is to be made plus or minus zero, plus or minus one or plus or minus two. Counter 2 is utilized to keep track of the particular standard number of teeth located in the table in memory just being compared at the moment. In the present embodiment, it is assumed that there are eight possible standard numbers of teeth which the flywheel of the engine under test may have. These are equivalent to industry standards on a very large percentage of the diesel engines in common use today: 92, 102, 103, 113, 118, 119, 142, and 152. Because these numbers are in some instances only one tooth apart, it is desirable to first compare to see if any of them are exactly alike, before comparing with three and five tooth leeways (plus or minus one, plus or minus two). In addition, in order to use a common arithmetic unit for comparison purposes, wherein the sign changes only if an inverse subtraction is made, the present exemplary process compares each of the standard numbers with the measured number by first determining whether the measured number is larger than the standard number, by subtracting (at instruction 20) the measured number from the standard number less 1, in which case a negative result indicates passing of the test because the measured number must be higher than the standard number less 1. And then in instruction 24 hereinafter, the standard number plus 1 is subtracted from the measured number, and it must be greater than the measured number in order to pass the test. In other words, the measured number is actually compared against a bracketing of the standard number to determine if it is greater than the standard number less 1 and less than the sandard number plus 1. Whenever a failure occurs on either the first or the second test, the process determines whether it's through the comparison or not, and if not, goes back to compare against the next item in the table, until the table is complete. Whenever a failure is indicated for the last number in the table, if comparisons have not been made three times (plus or minus zero, plus or minus one, plus or minus two), then the permissible increment is increased by branching from instruction 32 to instruction 12; but if all three passes have been made, then the measured amount is displayed and the process is ended. Whenever the second test indicates passage, the process ends by loading the value of the table that successfully passed both tests into the memory location where the measured amount had been stored.

A detail process in the exemplary diagnostic apparatus described hereinbefore may be according to the following instructions:

|  |  |
|---|---|
| START OF COMPARE | 11. Reset Counter 1<br>12. Advance Counter 1<br>13. Reset Counter 2<br>14. Advance Counter 2<br>15. Load MEM (Ctr 2) to A REG<br>16. Load Counter one to B REG<br>17. Subtract<br>18. Load RSLT to A REG<br>19. Load MEM (Count) to B REG |
| PASS LO | 20. Subtract; Skip one if − |
| FAIL LO | 21. Branch to 29<br>22. Load MEM (Ctr 2) to A REG<br>23. Load Counter 1 to B REG<br>24. Add<br>25. Load RSLT to B REG<br>26. Load MEM (Count) to A REG |
| FAIL HI | 27. Subtract; Skip one if + |
| PASS HI | 28. Branch to 36<br>29. Skip one if Counter 2 = 8<br>30. Branch to 14<br>31. Skip one if Counter 1 = 3<br>32. Branch to 12 |
| NONE | 33. Load MEM (Count) to Display<br>34. Display ERROR<br>35. END |
| EQUAL | 36. Reset B REG<br>37. Load MEM (Ctr 2) to B REG<br>38. Load B REG to MEM (Count)<br>39. Branch to 35 |

In exemplary data processing apparatus in which the present invention may be employed, the determination of the number of teeth on the flywheel is usually desired when a speed routine or other routine deriving speed or angular information from the tooth counter is desired. Since a program will proceed after finding the number of teeth with whatever routine required the tooth count, there is no need to display the amount selected from the table. The purpose of displaying the measured amount when it does not compare with any of the table amounts is to give the operator an indication that something is wrong, to provide an indication of why the program has hung up (which it will if a speed routine is waiting for the tooth count), and to give the opportunity to the operator to key in some tooth value from the keyboard, if he so desires. That function is simply a data loading operation which can be made in accordance with techniques well known in the art, and is not described herein.

Similarly, although the invention has been shown and described with respect to exemplary embodiments thereof, it should be understood by those skilled in the art that the foregoing and various other changes, additions and omissions may be made therein and thereto without departing from the spirit and the scope of the invention.

Having thus described typical embodiments of our invention, that which we claim as new and desire to secure by Letters Patent is:

1. Apparatus for determining the number of teeth on the flywheel of an internal combustion engine, comprising:
   tooth sensing means adapted to be disposed to sense the passage of each tooth of the flywheel of the engine when the engine is rotating, said means providing a tooth signal each time that an integral number of teeth of the flywheel passes in proximity to said tooth sensing means;
   means for registering a plurality of standard data manifestations, each one representing a number indicative of a number of teeth permissible on a flywheel of an internal combustion engine of the type under test;
   processing means, responsive to the tooth signals presented by said tooth sensing means and to said registering means, for measuring the number of said tooth signals provided as the engine rotates through a known angle and presenting a measured data manifestation indicative of the number of teeth on said flywheel, for comparing said measured data manifestation with each of said standard data manifestations and for selecting one of said standard data manifestations of said registering means as a result of the comparison; and
   means presenting for system use a manifestation of the standard number of teeth indicated by said selected one of said standard data manifestations as the determined number of teeth on the flywheel of the engine under test.

2. Apparatus according to claim 1 wherein said standard data manifestations include manifestations indicating standard numbers of teeth permitted on engine flywheels according to industry standards.

3. Apparatus according to claim 1 wherein said processing means includes means for determining when the measured number of teeth is within a given number of teeth of the number of teeth represented by one of said standard data manifestations, and otherwise presenting a display of said measured number and an error indication, said given number of teeth being a very small fraction of the number of teeth represented by said data manifestations.

4. Apparatus according to claim 1 further comprising:
   identification means adapted to be disposed for resonse to the presence of a particular member of the engine under test in a manner to present a signal corresponding to a known angle of revolution of the engine, and for generating an ID signal in response to said engine member being in proximity with said identification means; and
   wherein said processing means provides said measured data manifestation by counting the number of said tooth signals in relation to said ID signals and relating said number to a single revolution of said engine.

5. Apparatus according to claim 1 wherein said tooth sensing means provides a tooth signal each time that one tooth of the flywheel passes in proximity to said tooth sensing means.

6. In the method of electrically determining the number of teeth on the flywheel of an internal combustion engine, the steps of:
- sensing the number of teeth of the flywheel of the engine that pass a particular point as the engine rotates through a known angle and relating that number to a revolution of the engine to provide a measured number of teeth; and
- comparing the measured number of teeth with each of a plurality of permissible number of teeth and selecting one of said permissible number of teeth as the determined number of teeth on the flywheel of the engine as a result of the comparison.

7. In the method of determining the number of teeth on the flywheel of an internal combustion engine, utilizing electronic diagnostic apparatus, the steps of:
- electrically determining the time interval for the engine to rotate through a known angle;
- counting the number of teeth of the flywheel which traverse a particular point during said time interval;
- relating the number of teeth sensed during said time interval to the number of teeth correspondingly relating to a full revolution of the engine to provide a measured number of teeth;
- providing manifestations of permissible number of teeth in the engine;
- comparing the measured number of teeth with the permissible number of teeth and selecting for use one of said permissible number of teeth which most nearly corresponds to the measured number of teeth.

8. In the method according to claim 7, the additional steps of:
- determining the magnitude of difference between the measured number of teeth and any of said desired number of teeth, and if said difference is greater than a determined amount displaying said measured number and generating an error signal, where said determined amount is a small fraction of any of said number of teeth.

9. The method according to claim 7 wherein said time interval is determined by measuring the time between successive occurrences of an engine member achieving a specific position in a known relationship to the angle of revolution of the engine.

* * * * *